(12) United States Patent
Strütt et al.

(10) Patent No.: US 11,901,149 B2
(45) Date of Patent: Feb. 13, 2024

(54) COMPONENT THAT CAN BE SOLDERED IN SMD TECHNOLOGY AND METHOD FOR PRODUCING A COMPONENT THAT CAN BE SOLDERED IN SMD TECHNOLOGY

(71) Applicant: Endress+Hauser SE+Co. KG, Maulburg (DE)

(72) Inventors: Bernd Strütt, Steinen (DE); Dietmar Birgel, Schopfheim (DE); Silke Czaja, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 129 days.

(21) Appl. No.: 17/637,144

(22) PCT Filed: Aug. 3, 2020

(86) PCT No.: PCT/EP2020/071818
§ 371 (c)(1),
(2) Date: Feb. 22, 2022

(87) PCT Pub. No.: WO2021/032455
PCT Pub. Date: Feb. 25, 2021

(65) Prior Publication Data
US 2022/0301802 A1 Sep. 22, 2022

(30) Foreign Application Priority Data

Aug. 22, 2019 (DE) ............... 10 2019 122 611.2

(51) Int. Cl.
*H01H 85/046* (2006.01)
*H01C 1/144* (2006.01)
(Continued)

(52) U.S. Cl.
CPC ......... *H01H 85/046* (2013.01); *H01C 1/144* (2013.01); *H01C 1/148* (2013.01); *H01H 1/5805* (2013.01); *H01H 2001/5888* (2013.01)

(58) Field of Classification Search
CPC ...... H01C 1/144; H01C 1/148; H01H 85/046; H01H 2085/0483; H01H 2001/5888
See application file for complete search history.

(56) References Cited

U.S. PATENT DOCUMENTS

| 2,987,813 A | 6/1961 | Pope et al. |
| 4,774,760 A | 10/1988 | Seaman et al. |

(Continued)

FOREIGN PATENT DOCUMENTS

| CN | 1311517 A | 9/2001 |
| CN | 2479637 Y | 2/2002 |

(Continued)

OTHER PUBLICATIONS

EP 2947696, machine translation. (Year: 2015).*

*Primary Examiner* — Kyung S Lee
(74) *Attorney, Agent, or Firm* — Mark A. Logan; Endress+Hauser (USA) Holding, Inc.

(57) ABSTRACT

An SMD-solderable component comprises a resistance element, a first contact element, and a second contact element, wherein the first contact element is connected with a first end section of the resistance element by means of a first soldered connection and the second contact element is connected with a second end section of the resistance element by means of a second soldered connection. At least one of the first soldered connection and the second soldered connection is a lead-free soldered connection that is made with a lead-free solder preform. Further disclosed is a method for producing an SMD-solderable component.

14 Claims, 3 Drawing Sheets

(51) Int. Cl.
  *H01C 1/148*  (2006.01)
  *H01H 1/58*  (2006.01)

(56)  References Cited

U.S. PATENT DOCUMENTS

| | | | | |
|---|---|---|---|---|
| 4,984,130 | A * | 1/1991 | Dull | H01C 1/148 |
| | | | | 361/321.1 |
| 5,739,740 | A * | 4/1998 | Stark | H01H 85/17 |
| | | | | 337/248 |
| 6,515,572 | B2 * | 2/2003 | Groen | H01C 1/142 |
| | | | | 29/610.1 |
| 8,154,379 | B2 * | 4/2012 | Theissl | H01C 1/1406 |
| | | | | 338/307 |
| 9,230,718 | B2 * | 1/2016 | Tsuchida | H01C 7/008 |
| 10,099,318 | B2 * | 10/2018 | Rossberg | B23K 31/02 |
| 2007/0012750 | A1 | 1/2007 | Kobayashi et al. | |
| 2015/0028084 | A1 * | 1/2015 | Jenrich | H01R 4/024 |
| | | | | 228/122.1 |
| 2021/0268593 | A1 * | 9/2021 | Schmidt | H05K 1/181 |

FOREIGN PATENT DOCUMENTS

| | | | |
|---|---|---|---|
| CN | 1790964 | A | 6/2006 |
| CN | 102422376 | A | 4/2012 |
| CN | 102760614 | A | 10/2012 |
| CN | 106128665 | A | 11/2016 |
| CN | 108262577 | A | 7/2018 |
| CN | 108788509 | A | 11/2018 |
| CN | 109427516 | A | 3/2019 |
| CN | 109967914 | A | 7/2019 |
| EP | 0245677 | A2 | 11/1987 |
| EP | 1455375 | A1 | 9/2004 |
| EP | 2947696 | B1 * | 9/2020 ............ B60L 3/0046 |
| JP | 2000068636 | A | 3/2000 |

* cited by examiner

COMPONENT THAT CAN BE SOLDERED IN SMD TECHNOLOGY AND METHOD FOR PRODUCING A COMPONENT THAT CAN BE SOLDERED IN SMD TECHNOLOGY

CROSS-REFERENCE TO RELATED APPLICATIONS

The present application is related to and claims the priority benefit of German Patent Application No. 10 2019 122 611.2, filed on Aug. 22, 2019 and International Patent Application No. PCT/EP2020/071818, filed on Aug. 3, 2020, the entire contents of which are incorporated herein by reference.

TECHNICAL FIELD

The invention relates to an SMD-solderable component and to a method for producing an SMD-solderable component, comprising:
a resistance element
a first contact element and a second contact element, wherein the first and second contact elements are provided for soldering to contact areas provided therefor on the circuit board, wherein the first contact element is connected with a first end section of the resistance element by means of a first soldered connection and the second contact element is connected with a second end section of the resistance element by means of a second soldered connection. Furthermore, the invention relates to a method for producing an SMD-solderable component, to an electronics unit having an SMD-solderable component and to an automation field device having an electronics unit.

BACKGROUND

The state of the art uses a classification of soldered connections based on the liquidus temperature of the solder. In the case of a liquidus temperature of under 450° C., such is by definition a so-called soft soldered connection. From 450° C., one speaks of a hard soldered, or brazed, connection, since such has, in general, a higher mechanical strength. The invention relates especially to an SMD-solderable component, in the case of which the first and second soldered connections are embodied as soft soldered connections.

The SMD-solderable component is provided for soldering to a circuit board of an electronics unit. SMD-solderable components (short for 'Surface Mounted Devices' i.e. surface-mountable components) are soldered with their contact elements directly to connection locations provided for them. For this, the SMD components are placed by automatic pick and place machines on contacts equipped with solder paste on the circuit board and soldered in a so-called reflow soldering process in a reflow soldering oven. In this way, a large number of SMD-solderable components can be soldered onto a circuit board all at the same time.

In automation technology, especially in process automation technology, field devices are often applied for determining and/or monitoring process variables. Referred to as field devices, in such case, are, in principle, all devices, which are applied near to a process and deliver, or process, process relevant information. Involved are, for example, fill level measuring devices, flow measuring devices, pressure- and temperature measuring devices, pH-redox potential measuring devices, conductivity measuring devices, etc., which register the corresponding process variables, fill level, flow, pressure, temperature, pH value, and conductivity. Field devices have often a sensor unit standing, especially at least at times and/or at least sectionally, in contact with a process medium. The sensor unit serves for producing a signal dependent on the process variable of interest. Furthermore, field devices often have an electronics unit arranged in a housing, wherein the electronics unit serves for processing and/or forwarding signals, especially electrical and/or electronic signals, produced by the sensor unit. Typically, the electronics unit includes at least one circuit board with components arranged thereon. Especially, the electronics unit is an electronics unit of an automation field device.

Known from the state of the art are SMD-solderable components having a lead-containing, (soft-) soldered connection. Such components are provided for soldering to a circuit board of an electronics unit, especially of an automation field device.

For protecting the environment and people, one strives in the present state of the art to avoid the use of heavy metals, such as e.g. lead and mercury. To the same end, also the RoHS-Directive (Restriction of Certain Hazardous Substances) of the European Union forbids the use of certain dangerous materials, such as e.g. lead, in the electronic and electrical industries. This means that lastly also all components of an SMD-solderable component, especially also the soldered connections produced in the case of its manufacture, should be as lead-free as possible.

Since the properties of the SMD-solderable component is determined, among other things, by a resistance between its contact elements, additionally, the first and/or second soldered connection(s) must be of a correspondingly high quality, in order that it be assured that the SMD-solderable component actually also reliably satisfies the resistances set forth in its specification.

SUMMARY

An object of the invention, therefore, is to provide a lead-free SMD-solderable component, which has with a sufficiently high reliability a predetermined resistance between its contact elements.

The object is achieved by an SMD-solderable component and a method for producing an SMD-solderable component.

Regarding the SMD-solderable component, the object is achieved by an SMD-solderable component for soldering to a circuit board of an electronics unit, comprising:
a resistance element,
a first contact element and a second contact element, wherein the first and second contact elements are provided for soldering to contact areas provided therefor on the circuit board,
wherein the first contact element is connected with a first end section of the resistance element by means of a first soldered connection and the second contact element is connected with a second end section of the resistance element by means of a second soldered connection,
characterized in that
at least one of the first and second soldered connections is a lead-free soldered connection, which is made with a lead-free solder preform.

The use of a lead-free solder preform, on the one hand, assures that the first and/or second soldered connection(s) conform(s) to the above mentioned ROHS standards.

On the other hand, solder preforms are significantly easier to handle in the production of the SMD-solderable component compared with solder pastes and/or solder wires. Because of this production advantage, the first and second soldered connections have reliably a sufficiently high quality, and, correspondingly, the SMD-solderable component has with a sufficiently high reliability the resistance specified therefor. The resistance element is especially an elongated resistance element.

In an embodiment of the SMD-solderable component, the SMD-solderable component is an overcurrent protection device, especially a melting fuse, having a tripping current, wherein the tripping current of the overcurrent protection device lies especially between 0.02 and 1 A (ampere).

In an embodiment of the SMD-solderable component, the SMD-solderable component has a dimension of maximum 20 mm (millimeter), wherein a separation between the contact elements is especially less than 15 mm. The "separation" between the contact elements is especially a separation between the faces of the contact elements, on which the soldered connections border.

The advantage of the simpler handling of a solder preform compared with solder pastes and/or solder wires is noticed especially in the case of small components, since, in such case, the components (namely the first and/or second contact element and the resistance element) to be connected with one another by means of the first and/or second soldered connection(s) by material bonding have correspondingly small dimensions.

Regarding the method for producing an SMD-solderable component, the object is achieved by a method for producing an SMD-solderable component having
a resistance element
a first contact element and a second contact element, comprising steps as follows:
producing a first soldered connection, by means of which a first end section of the resistance element is connected with the first contact element,
producing a second soldered connection, by means of which a second end section of the resistance element is connected with the second contact element,
wherein for producing at least one of the first and second soldered connections a lead-free solder preform is used, which is arranged between the first end section and the first contact element or the second end section and the second contact element.

Especially, the SMD-solderable component is provided for soldering to a circuit board of an electronics unit.

In an embodiment of the method, the solder preform is coated with a flux. The method step of coating with flux is typically performed before producing the first or second soldered connection. For example, a so-called drum coating is used, in the case of which the solder preform is coated completely with flux.

In a preferred embodiment of the method, a solder preform is used, whose melting temperature is less than the melting temperature of a coating of the resistance element, especially a tin coating.

In this especially preferred embodiment, thus, a lead-free solder preform having a low melting temperature is used. In this way, it is prevented that in the production of the first and/or second soldered connection(s) a premature aging of parts of the SMD-solderable component, especially of the resistance element, takes place. Especially, it is prevented that a coating of the resistance element melts, whereby the resistance between the contact elements and/or the tripping current of the above mentioned overcurrent protection device are/is unfavorably influenced. A premature aging caused by the melting of the coating is, thus, effectively prevented.

In an especially preferred embodiment of the method, a solder preform is used, whose melting temperature is less than 230° C., especially less than 150° C.

A lead-free solder preform having such a low melting temperature (also liquidus temperature or soldering temperature) is known in the state of the art from the article, "Preform-based diffusion soldering for use under conventional soldering process parameters", by H. M. Daoud et al. (European Microelectronics unit and Packaging Conference (EMPC) & Exhibition, DOI 10.23919/ECLC.2017.8346889). The therein described solder preform is available from the firm, Pfarr, under the mark PFDS400®. The solder preform is composed of a composite material, which has a solder alloy as a first composite component, which is arranged in a metal matrix forming the second composite component. The second composite component is especially a metal having a relatively high melting temperature, such as, for instance, copper or silver. The solder alloy is arranged, in such case, in layers, or plies, in the metal matrix. The solder preform is oriented in the case of soldering preferably in such a manner that the layers, or plies are essentially arranged in parallel with the two solderable surfaces of the components to be connected.

The solder preform is characterized by features including that upon soldering intermetallic phases are formed, which extend along the layers of the solder alloy. Because of the ply shaped construction of the solder preform, the intermetallic phases are arranged essentially uniformly distributed over the entire soldered connection, whereby the soldered connections produced with the solder preform have an excellent mechanical durability. A soldered connection with traversing, intermetallic phases extending over the entire soldered connection is otherwise only known in connection with the above mentioned, hard soldered connections.

Another advantage of the solder preform is that the soldered connection produced with the PFDS400® solder preform has, in spite of the comparatively low melting temperature of the solder preform, the ability to serve under significantly higher working temperatures before any danger of a remelting of the soldered connection. For example, a PFDS400® solder preform having a tin-containing solder alloy has a melting temperature of, for instance, 225° C., while a soldered connection produced therewith remains strong under working temperatures of at least 400° C. A PFDS400® solder preform with an indium-containing solder alloy has an even lower melting temperature of about 125° C., while a soldered connection produced therewith has service temperatures of at least 325° C.

A further, general advantage in the case of application of solder preforms is that their shape is essentially fittable to the special embodiments of the components to be soldered, especially their shapes (i.e., in the case here, to the shapes of the resistance element and the contact elements). In this way, soldered connections of high quality are manufacturable especially easily with the method of the invention. Such a fitting of the solder preform is explained in greater detail in the following additional developments.

In a first additional development of the method, solder preforms are used, which have facing the first end section or the second end section, as the case may be, a face, in which a guide is present extending into the solder preform with a specified depth and serving for receiving the first or the second end section, as the case may be, and wherein the method comprises a method step as follows:

introducing the first and second end sections, respectively, each into a guide of an associated solder preform, before producing the first and second soldered connections.

In a second additional development of the method, a solder preform is used, whose guide is conically tapered.

In an embodiment of this additional development, a solder preform is used, which has essentially the form of a complete torus, wherein the interior of the complete torus forms the guide.

In an additional embodiment of the method, the resistance element is a wire wound around an electrically insulating core, wherein upon introduction of the first or second end section into the guide, in each case, a predetermined minimum number of turns of the wire is located in the guide of the solder preform.

In this way, a sufficiently good contact between the electrically conductively wire and the solder preform is assured. This leads to an especially high quality of the soldered connection produced with the solder preform between a contact element and the solder preform.

For example, at least 10 turns of the wire are located in the guide of a solder preform.

In an additional embodiment of the method, the diameter of the guide amounts to 1.1 times a diameter of the insulating core.

In a preferred embodiment of the method, the first contact element and/or the second contact element are/is pot shaped, wherein a solder preform is placed in a pot shaped contact element before a soldered connection is made, and then an end section of the resistance element is introduced into the guide, and wherein a solder preform is used, whose shape is fitted to the contour of the interior of the pot shaped contact element.

Such pot shaped contact elements are used, for example, for producing SMD-solderable, overcurrent protection devices, wherein the overcurrent protection devices are characterized by a tripping current and a resistance between the contact elements.

The invention relates especially also to the use of a lead-free solder preform in the production of the first soldered connection and/or second soldered connection.

The invention relates, furthermore, to an electronics unit having a circuit board, wherein the SMD-solderable component of the invention, especially the SMD-solderable component made according to the method of the invention, is soldered onto contact areas provided on the surface of the circuit board.

In an embodiment of the electronics unit, the electronics unit is embodied for use in explosion endangered areas. Such electronic units must satisfy very high safety requirements as regards explosion protection. The explosion protection aims especially safely to prevent the forming of sparks or at least to assure that a spark arisen upon a malfunction has no effect on the surroundings. For this, a series of protection classes are defined in corresponding standards, especially in European standard IEC 600079-11 and/or EN60079-11.

For example, in the protection class, "intrinsic safety" (Ex-i), the explosion protection is achieved by keeping the values for certain electrical variables (electrical current, voltage, power) at all times below predetermined limit values, in order that no ignition sparks can form in the case of a malfunction. In the additional protection class, "increased safety" (Ex-e), the explosion protection is obtained by making the spatial separations between two different electrical potentials sufficiently large, such that a spark formation cannot, due to the separation, occur in the case of a malfunction. In the additional protection class, "pressure resistant encapsulation" (Ex-d), electronic units embodied according to this protection class must have a sufficient mechanical strength, or stability.

Comparable protection classes are defined in the American standard, FM3610 and/or ANSI/UL60079-11, and/or the Canadian standard CAN/CAS C 22.2 No. 60079-11.

The SMD-solderable component, especially the SMD-solderable overcurrent protection device, is, thus, used in the case of an electronics unit embodied for use in explosion endangered areas. Especially, the electronics unit is, thus, embodied according to a protection class of the above mentioned standards. In such case, the reliability of the overcurrent protection device of the invention achieved by the high quality of the first and/or second soldered connection(s) is of especially great importance.

The invention relates, furthermore, to an automation field device having an electronics unit of the invention.

BRIEF DESCRIPTION OF THE DRAWINGS

The invention will now be explained in greater detail based on the appended, schematic drawing, wherein equal reference characters refer to equal features. When perspicuity requires or it otherwise appears sensible, reference characters already shown in earlier figures are omitted in subsequent figures.

The figures of the drawing show as follows.

DETAILED DESCRIPTION

Figure 1:
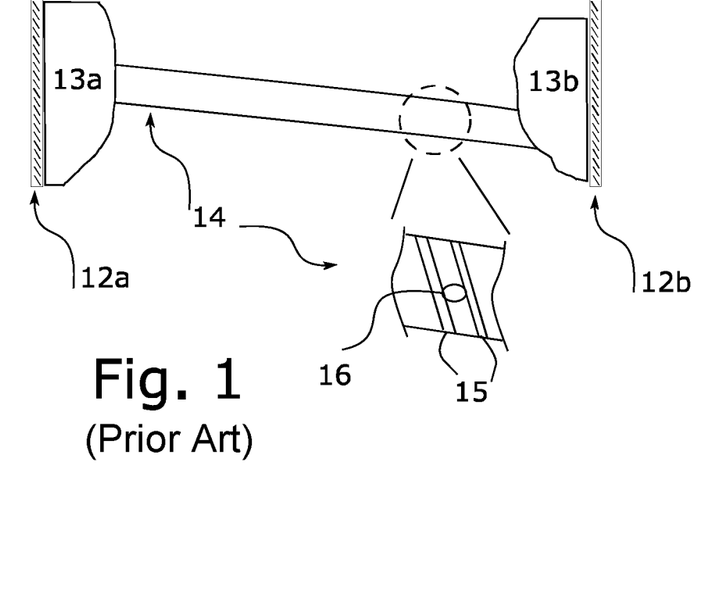
FIG. 1 shows an SMD-solderable component according to the state of the art.

FIG. 1 shows an SMD-solderable component according to the state of the art. The SMD-solderable component includes two contact elements 12a,12b, which are provided for soldering to contact areas provided on a circuit board of an electronics unit. Arranged between the contact elements 12a,12b is a resistance element 14, which is connected at its end sections with the contact elements 12a,12b by material bonding, thus, in each case, by means of a lead-containing, soldered connection 13a,13b. In the case of the SMD-solderable component according to the state of the art, the soldered connections 13a,13b are produced by means of a lead-containing solder wire. Because of the demanding handling of the solder wire, an optimum orientation of the resistance element 14 relative to the contact elements is not always obtained in the production of the soldered connection. This is true especially for the case, in which the SMD-solderable component is especially small, i.e. having a maximum dimension of 1 cm or less.

Investigations of the applicant on a series of SMD-solderable components produced in equal manner according to the state of the art show that in the case of some of the SMD-solderable components the soldered connection 13b is only present at the edge of the contact element 12b, such as shown in FIG. 1, and, furthermore, the resistance element 14 extends slightly inclined between the two contact elements 12a,12b.

The resistance element 14 is a wire 15 wound around an insulating core. The investigations of the applicant show further that in some cases an undesired forming of solder beads 16 (also solder bridges) between neighboring turns of the wound wire 15 can occur. Such is shown, by way of example, in the detail of the dashed circle. The solder beads 16 arise from an at least partial melting the wire 15 caused by a high soldering temperature in the production of the soldered connections 13a,13b. The solder beads 16 short circuit mutually adjoining turns of the wire 15, such that the effective length and therewith the resistance of the resistance element 14 is influenced.

The combination of the undesired properties (inclination of the resistance element 1; soldered connection 13b on the edge of the contact element 12b; forming of the solder beads 16) shown in FIG. 1 and caused in the production of the SMD-solderable component during production of the soldered connections 13a,13b, can in the most unadvantageous case lead to the SMD-solderable component no longer satisfying the relevant specifications. For example, a predetermined resistance between the contact elements 12a,12b and/or a predetermined tripping current of an SMD-solderable component formed as an overcurrent protection means cannot be achieved.

Another great disadvantage is that the investigated soldered connections 13a, 13b are lead-containing soldered connections 13a, 13b.

Figure 2:
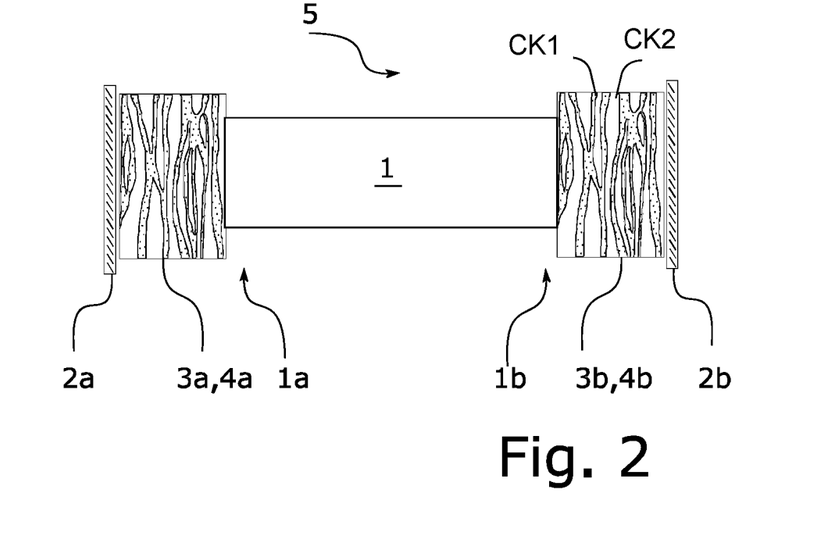
FIG. 2 shows an embodiment of the SMD-solderable component of the present disclosure.

The invention provides an improved SMD-solderable component 5, and an improved method for producing an SMD-solderable component 5, for overcoming the disadvantages observed in the state of the art. FIG. 2 provides more detail.

Used for producing first and second soldered connections 3a,3b are PFDS400® lead-free solder preforms 4a,4b. The solder preforms 4a,4b are arranged between respective first and second end sections 1a, 1b of a resistance element 1 and respective contact elements 2a,2b. The solder preforms 4a,4b are composed of a composite material, in the case of which an Sn or In-containing solder alloy is embedded as a first composite component CK1 (here shown as dotted areas) essentially layer shaped in a copper- or silver matrix forming the second composite component CK2 (here shown as white areas). The solder preforms 4a,4b are, in such case, placed on the solderable surface of their contact elements 2a,2b in such a manner that the layers, or plies, of the first composite component CK1, i.e. the solder alloy, are arranged essentially in parallel with the solderable surfaces of the contact elements 2a,2b.

A significant advantage of the solder preforms 4a,4b are their comparatively low soldering temperature, namely they have a melting temperature Tsolder (also soldering temperature) of under 230° C. In this way, a deterioration of the resistance element 1 in the production of the soldered connections 3a,3b caused by a high soldering temperature can be avoided.

The melting temperature Tsolder of the solder preform 4a,4b in the production of the soldered connections 3a,3b is reached, for example, by a reflow process using a vapor phase heat transfer medium, or by a selective soldering method. Selective soldering methods include soldering with a soldering iron or gun, light soldering methods, for instance, with a laser or infrared radiation, induction soldering or soldering by means of microwaves, as well as the hot bar selective soldering method, in the case of which a bar is pressed against the solder joint and the soldering temperature is obtained by means of an electrical current flowing through the bar.

Since a lead-free solder preform 4a,4b is involved, the soldered connections 3a,3b produced therewith and, thus, also the SMD-solderable component 5 are advantageously lead-free. The use of the lead-free solder preform 4a,4b in the production of the soldered connections 3a,3b is, additionally, recognizable in the case of the SMD-solderable component 5 in that intermetallic phases formed in the soldering are distributed essentially uniformly over the entire thickness of the soldered connection 3a,3b. In the case of a lead-containing soldered connection 13a, 13b produced in a soft soldering, the intermetallic phases are, in contrast, essentially limited to a first boundary layer between the soldered connection 13a, 13b and the contact element 12a, 12b and a second boundary layer between the soldered connection 13a, 13b and the first end section 1a, second end section 1b.

The solder preform 4a,4b is advantageously fitted to the contact elements 2a,2b and the resistance element 1. This is shown in greater detail in FIGS. 3a-3c for the first soldered connection 3a and a solder preform 4a used for its production. Naturally, all examples of embodiments and explanations shown in connection with FIGS. 3a-3c hold equally also for the second soldered connection 3b and for a solder preform 4b used for its production.

Figure 3A:
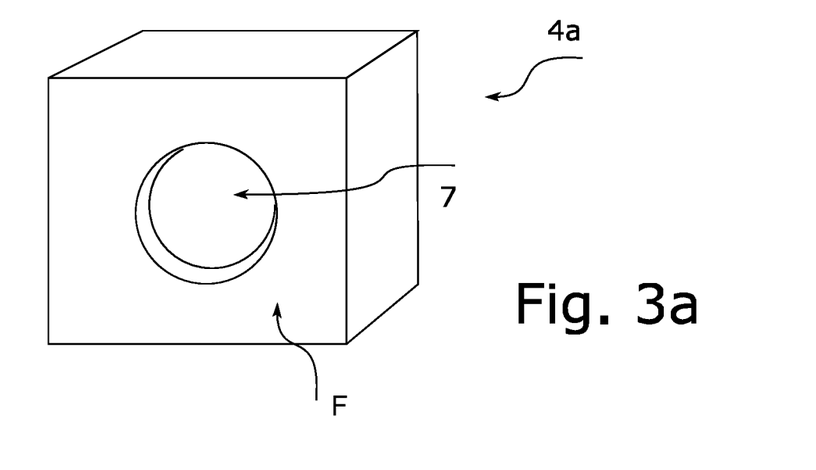
FIG. 3a shows a perspective view of an embodiment of the solder preform, which is used in the production of the SMD-solderable component of the present disclosure.

The solder preform 4a is advantageously very easily completely coatable, i.e. on all its surfaces, with a flux, for example, in the context of a drum coating.

FIG. 3a shows a perspective view of a solder preform 4a, which is used in the production of the soldered connection 3a between an elongated, especially essentially completely cylinder shaped, resistance element 1 and a contact element 2a. The solder preform 4a is fitted in its shape to the resistance element 1 and to the contact element 3a.

Figure 3B:
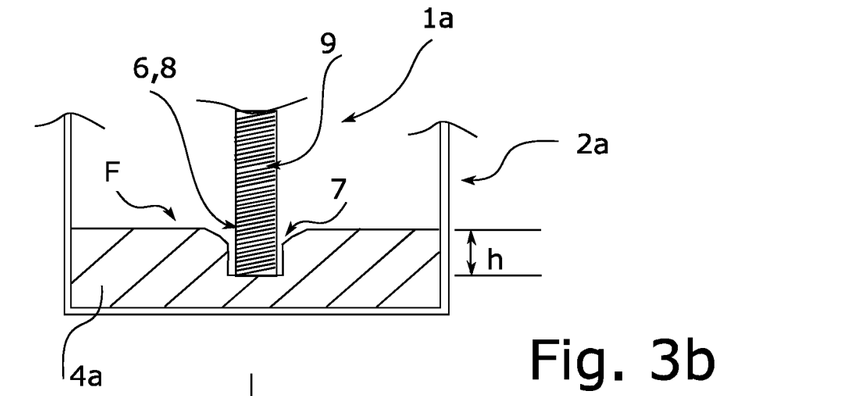
FIGS. 3b,c show sectional views of details in the production of the first soldered connection in an embodiment of the present disclosure.

This is shown in greater detail in FIG. 3b, which shows a sectional view of a detail of the components 2a,1a to be connected in the production of the soldered connection 3a.

Thus, the contact element 2a is in such case a pot shaped end cap having a rectangular floor, in which the solder preform 4a is placed before the production of the soldered connection 3a. For this, the solder preform 4a is embodied essentially prismatically. The shape of the solder preform 4a, especially its outer contour, is, thus, fitted to the inner contour of the contact element 2a in the form of a pot shaped end cap.

In another embodiment, the solder preform 4a has essentially the form of a complete torus. Such is advantageous, for example, for an as uniform as possible distribution of the melted solder upon melting of the solder preform 4a and/or in the case of a hollow cylinder shaped contact element 2a, i.e. a pot shaped end cap having a round floor.

The solder preform 4a includes a guide 7, embodied e.g. as a blind hole, although it can also pass all the way through. Guide 7 starts, in such case, from that face F of the solder preform 4a, which during soldering faces the first end section 1a of the elongated, resistive element 1. Guide 7 serves for introducing the first end section 1a into the solder preform 4a. It enables an especially easy orientating of the resistance element 1 relative to the solder preform 4a and the contact element 2a before the soldering of the contact element 2a with the first end section 1a. The guide 7 assures that the first end section 1a extends at least to a specified depth h in the solder preform 4a. Preferably, such as shown in FIG. 3b, guide 7 tapers conically.

As shown in FIG. 3b, the elongated resistance element 1 is a conducting wire 8, which is wound around an insulating core 9. The specified depth h assures that a minimum number of turns of the wire 8 required for a sufficiently well conducting contact between resistance element 1 and contact element 2a is located in the solder preform 4a.

Figure 3C:
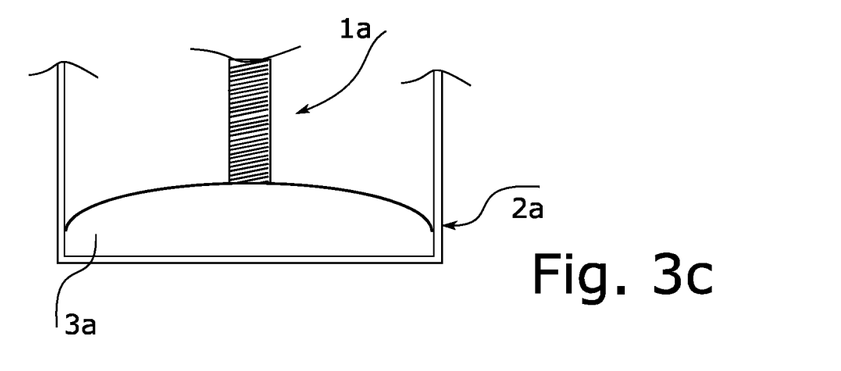

The guide 7 and/or the fitted shape of the solder preform 4a simplify the production of the SMD-solderable component 5. Thus, an SMD-solderable component 5 is produced with a soldered connection 3a of a reliably high quality. Such is shown in FIG. 3c.

Furthermore, due to the temperatures of under 230° C. used in the production of the soldered connection 3a, a premature aging of the wire 8, especially also a melting of a coating 6 of the wire 8 and an accompanying forming of solder beads between, for example neighboring, turns, are effectively prevented.

The risk of forming of solder beads is especially large, when the SMD-solderable component 5 is especially small, or when a separation of neighboring turns of the wound wire 8 is especially small. Such is e.g. the case for overcurrent protection devices, which have a tripping current between 0.02 to 1 A and a dimension of less than 2 cm. The invention is thus especially suited for such SMD-solderable components.

Figure 4:
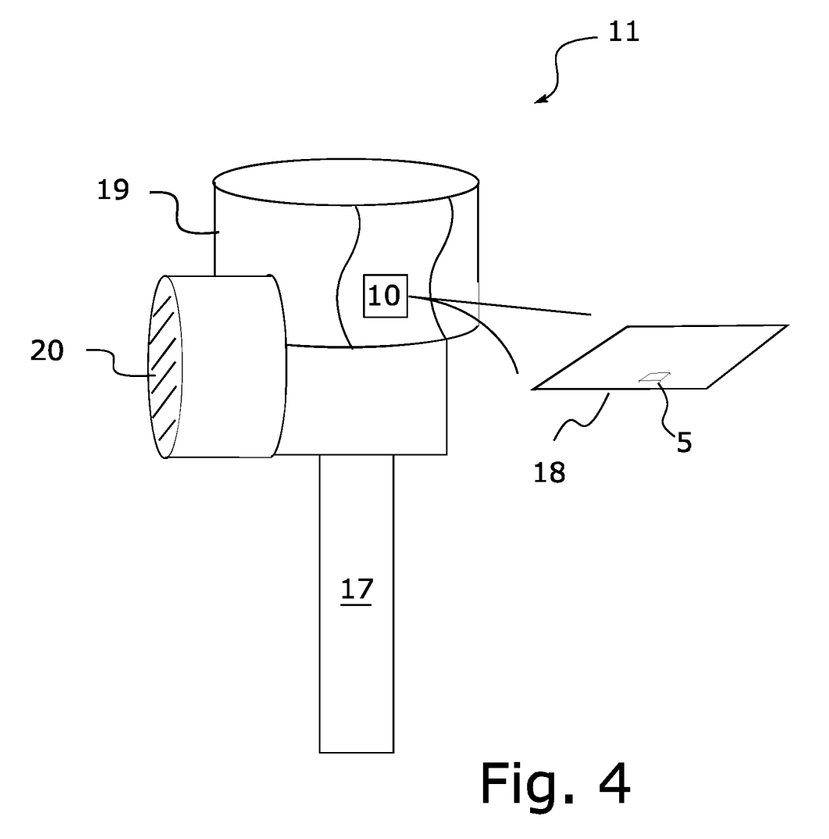
FIG. 4 shows an embodiment of an automation field device having an electronics unit, which has an embodiment of the SMD-solderable component of the present disclosure.

The SMD-solderable component 5 is applied in an electronics unit 10 of a field device 11 of automation technology. FIG. 4 shows such a field device 11 of automation technology in greater detail. Field device 11 includes, especially standing, at least at times and/or at least sectionally, in contact with a process medium, a sensor unit 17, which serves for producing a, for example, electrical and/or electronic, measurement signal representing the process variable.

The electronics unit 10 arranged in a transmitter housing 19 of the field device 11 serves for processing and/or forwarding of the measurement signals produced by the sensor unit 17. Typically, the electronics unit 10 includes at least one circuit board 18 with components arranged thereon. One of these components soldered on the circuit board 18 is the SMD-solderable component 5 of the invention.

In the embodiment shown in FIG. 4, the field device 11 includes another electronics unit 20, embodied as a display/input unit and having a (touch-)display. The SMD-solderable component 5 of the invention can, of course, also be soldered onto a circuit board of the electronics unit 20 embodied as the display/input unit.

In an embodiment, the SMD-solderable component 5 is the above mentioned overcurrent protection device (i.e. with above mentioned dimension, and the above mentioned tripping current) applied in the case of a field device 11 embodied for use in explosion endangered areas.

The invention claimed is:

1. A surface-mounted device (SMD)-solderable component for soldering to a circuit board of an electronics unit, comprising:
    a resistance element;
    a first contact element;
    a second contact element;
    a first lead-free solder preform; and
    a second lead-free solder preform,
    wherein the first solder preform and the second solder preform are each coated with a flux,
    wherein the first contact element and the second contact element are provided for soldering to contact areas provided on the circuit board,
    wherein the first contact element is connected with a first end section of the resistance element via a first lead-free soldered connection that is made with the first lead-free solder preform,
    wherein the second contact element is connected with a second end section of the resistance element via a second lead-free soldered connection that is made with the second lead-free solder preform,
    wherein each solder preform has a face in which a guide is present extending into the respective solder preform with a specified depth and serving for receiving the first end section or the second end section of the resistance element, and
    wherein the first end section is introduced into the guide of the first solder preform before the first soldered connection is made and the second end section is introduced into the guide of the second solder preform before the second soldered connection is made.

2. The SMD-solderable component as claimed in claim 1, wherein the SMD-solderable component is an overcurrent protection device having a tripping current, and wherein the tripping current of the overcurrent protection device lies between 0.02 and 1 A.

3. The SMD-solderable component as claimed in claim 1, wherein the SMD-solderable component has a dimension of maximum 20 mm, and wherein a separation between the first contact element and the second contact element is less than 15 mm.

4. A method for producing an SMD-solderable component having a resistance element, a first contact element, and a second contact element, the method comprising:
    producing a first soldered connection via which a first end section of the resistance element is connected with the first contact element; and
    producing a second soldered connection via which a second end section of the resistance element is connected with the second contact element;
    wherein for producing the first soldered connection and the second soldered connection, a first lead-free solder preform is arranged between the first end section and the first contact element and a second lead-free solder preform is arranged between the second end section and the second contact element,
    wherein each solder preform is coated with a flux,
    wherein each solder preform has a face in which a guide is present extending into the respective solder preform with a specified depth and serving for receiving the first end section or the second end section of the resistance element, and
    wherein the method further comprises:
        introducing the first end section and the second end section, respectively, each into a guide of an associated solder preform before producing the first soldered connection and the second soldered connection.

5. The method as claimed in claim 4,
    wherein the lead-free solder preform has melting temperature less than a melting temperature of a coating of the resistance element.

6. The method as claimed in claim 4, wherein the lead-free solder preform has melting temperature less than 230° C.

7. The method as claimed in claim 4,
    wherein each guide is conically tapered.

8. The method as claimed in claim 4,
wherein each lead-free solder preform is embodied in a form of a complete torus, wherein the interior of the complete torus forms the guide.

9. The method as claimed in claim 4,
wherein the resistance element is a wire wound around an electrically insulating core, and wherein upon introduction of the first end section or second end section, in each case, a predetermined minimum number of turns of the wire is located in the guide of the respective solder preform.

10. The method as claimed in claim 9,
wherein a diameter of the guide amounts to 1.1 times a diameter of the insulating core.

11. The method as claimed in claim 4,
wherein the first contact element and the second contact element are each pot shaped,
wherein each lead-free solder preform is placed in the respective contact element before the respective soldered connection is made and then the respective end section of the resistance element is introduced into the respective guide, and
wherein each lead-free solder preform is fitted to a contour of an interior of the respective pot shaped contact element.

12. An electronics unit, comprising:
a circuit board, the circuit board including an SMD-solderable component, including:
  a resistance element;
  a first contact element;
  a second contact element;
  a first lead-free solder preform; and
  a second lead-free solder preform,
  wherein the first solder preform and the second solder preform are each coated with a flux,
  wherein the first contact element and the second contact element are provided for soldering to contact areas provided on the circuit board,
  wherein the first contact element is connected with a first end section of the resistance element via a first lead-free soldered connection that is made with the first lead-free solder preform,
  wherein the second contact element is connected with a second end section of the resistance element via a second lead-free soldered connection that is made with the second lead-free solder preform,
  wherein each solder preform has a face in which a guide is present extending into the respective solder preform with a specified depth and serving for receiving the first end section or the second end section of the resistance element,
  wherein the first end section is introduced into the guide of the first solder preform before the first soldered connection is made and the second end section is introduced into the guide of the second solder preform before the second soldered connection is made, and
  wherein the SMD-solderable component is soldered onto the contact areas provided on the circuit board.

13. The electronics unit as claimed in claim 12, wherein the electronics unit is embodied for use in explosion endangered areas.

14. A field device of automation technology, comprising:
an electronics unit, including:
  a circuit board, the circuit board including an SMD-solderable component, including:
    a resistance element;
    a first contact element;
    a second contact element;
    a first lead-free solder preform; and
    a second lead-free solder preform,
    wherein the first solder preform and the second solder preform are each coated with a flux,
    wherein the first contact element and the second contact element are provided for soldering to contact areas provided on the circuit board,
    wherein the first contact element is connected with a first end section of the resistance element via a first lead-free soldered connection that is made with the first lead-free solder preform,
    wherein the second contact element is connected with a second end section of the resistance element via a second lead-free soldered connection that is made with the second lead-free solder preform,
    wherein each solder preform has a face in which a guide is present extending into the respective solder preform with a specified depth and serving for receiving the first end section or the second end section of the resistance element,
    wherein the first end section is introduced into the guide of the first solder preform before the first soldered connection is made and the second end section is introduced into the guide of the second solder preform before the second soldered connection is made, and
    wherein the SMD-solderable component is soldered onto the contact areas provided on the circuit board.

* * * * *